Nov. 25, 1924.  
J. H. EVANS  
LIQUID LEVEL INDICATOR  
Filed Aug. 11, 1923
1,517,000
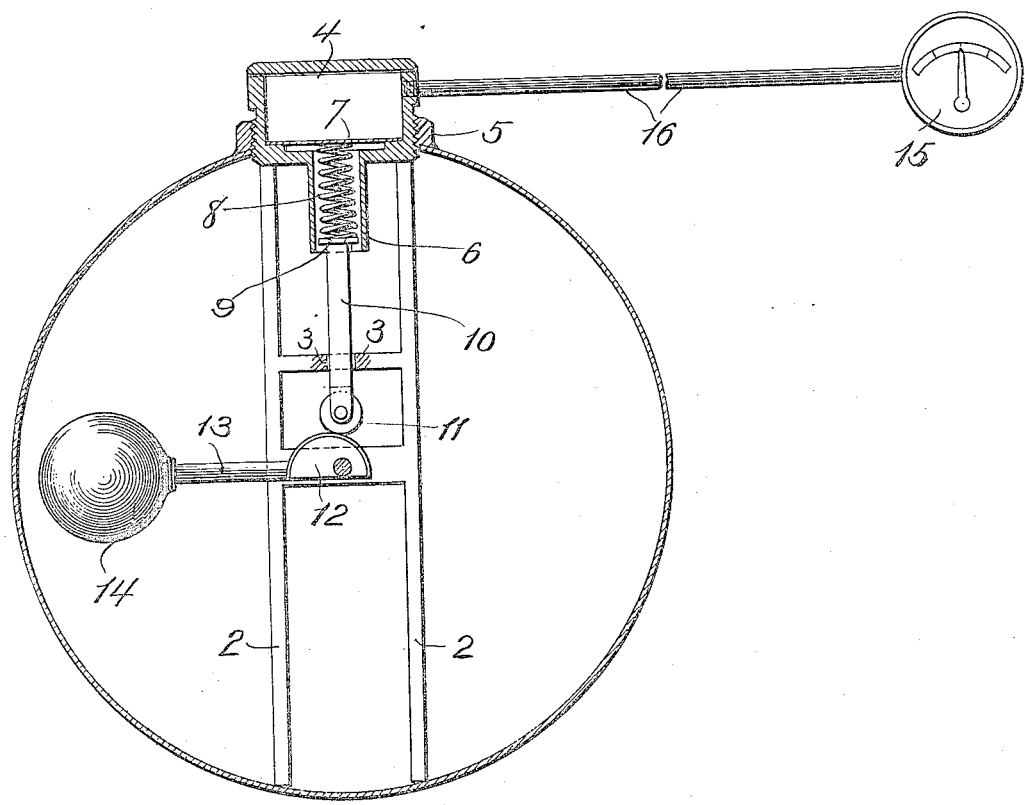

Patented Nov. 25, 1924.

1,517,000

UNITED STATES PATENT OFFICE.

JAMES HOWARD EVANS, OF LEXINGTON, KENTUCKY.

LIQUID-LEVEL INDICATOR.

Application filed August 11, 1923. Serial No. 656,954.

*To all whom it may concern:*

Be it known that I, JAMES HOWARD EVANS, a citizen of the United States, and resident of Lexington, in the county of Fayette and State of Kentucky, have invented certain new and useful Improvements in Liquid-Level Indicators; and I do hereby declare the following to be a full, clear, and exact description of the invention, such as will enable others skilled in the art to which it appertains to make and use the same.

This invention is a tank indicator for denoting at a point distant from a tank the quantity of liquid in the tank, and is intended more particularly to provide an indicator upon the instrument board of an automobile whereby the chauffeur may be informed of the quantity of fuel in the tank of the vehicle. The invention has for its object the provision of simple means operated by a float within the tank whereby pressure will be transmitted from the tank directly to a gage to actuate the same. This stated object and other objects which will appear incidentally in the course of the following description are attained in such a device as is illustrated in the accompanying drawing, and the invention resides in certain novel features which will be particularly pointed out in the appended claim.

The drawing is a transverse section of a tank having my improved indicator applied thereto.

The tank 1 may be of any desired form, construction and capacity. Within the tank and extending to the top thereof is a frame 2 which may be of any approved rigid construction having the guides 3 below its upper end. Carried by the upper end of the frame and extending through an opening in the top of the tank is a container 4 which is held against displacement by its threaded engagement with a collar 5 riveted, brazed or otherwise secured upon the tank. Depending from the bottom of the container 4 is a sleeve or tubular guide 6 which alines axially with an opening through the bottom of the container, and a flexible diaphragm 7 is secured across the container just above the bottom and over the said opening. A pressure spring 8 is housed within the sleeve 6 and bears at its upper end against the diaphragm and at its lower end upon a plunger 9 on the upper end of a plunger rod 10 which extends between the guides 3 and is held to a rectilinear path thereby. A roller 11 is mounted on the lower end of the rod 10 and rides upon an eccentric 12 which is fixed to or formed on a lever 13, said lever being pivoted to the frame 2 in alinement with the plunger rod 10 and carrying a float 14 at its free end. The tank may be secured at any point of the vehicle and an indicator 15 is secured upon the instrument board and operatively connected with the interior of the container 4 which constitutes a pressure chamber. The indicator may conveniently be a Bourdon gage calibrated to show quantities of gasoline, the connection between the gage and the container consisting of a tube 16. Said tube and the container are filled with fluid, as a gas, oil, glycerine, etc., and it may be of any desired length but it must be leak-proof.

The float 14 obviously will follow the level of the liquid in the tank and the eccentric 12 will act upon the plunger rod to vary the position of the same as the position of the float lever varies. When the tank is full, the float will be at or near the top thereof and the eccentric 12 will hold the plunger in its highest position, exerting maximum pressure upon the diaphragm. The pressure upon the diaphragm is transmitted directly to the fluid in the container and the tube 16 and the indicator will be set accordingly. As the fuel is withdrawn from the tank, the float will fall and the lever and eccentric will be swung so as to permit descent of the plunger rod. Any movement of the plunger rod varies the tension of the spring 8 and, consequently, of the pressure exerted upon and by the diaphragm so that the pressure fluid extending between the diaphragm and the gage will respond quickly to variations of level in the tank and the indicator will at all times accurately denote the quantity of fuel on hand.

My device is obviously simple, compact, inexpensive and accurate, and it may be installed wherever desired at a low cost.

Having fully described my invention what I claim as new and desire to secure by Letters Patent, is:—

In a tank indicator, the combination of a tank, a frame therein, a container at the top of the tank, a sleeve depending from the container, a diaphragm extending across the bottom of the container and over the upper end of the sleeve, an indicator, a fluid pressure connection between the indicator and the container and controlled by said diaphragm, a pressure spring housed axially in the sleeve and bearing at its upper end against the diaphragm, a plunger within the sleeve supporting the spring, a plunger rod carrying the plunger and extending through the lower end of the sleeve and guided by the frame in a rectilinear path, a float-controlled lever pivoted on the frame below the plunger rod, and an eccentric on the lever supporting the plunger rod.

In testimony whereof, I have signed this specification in the presence of two subscribing witnesses.

JAMES HOWARD EVANS.

Witnesses:
TILFORD L. WILSON,
GEORGIA BAND.